(12) United States Patent
Huang et al.

(10) Patent No.: US 6,319,982 B1
(45) Date of Patent: *Nov. 20, 2001

(54) WATERBORNE SILICONE ADHESIVES, SEALANTS AND COATINGS

(75) Inventors: Misty Weiyu Huang, New City; Bruce A. Waldman, Cortlandt Manor; Jeff A. Cooke, Brewster, all of NY (US)

(73) Assignee: CK Witco Corporation, Greenwich, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,347

(22) Filed: Jun. 25, 1999

Related U.S. Application Data

(63) Continuation-in-part of application No. 09/149,337, filed on Sep. 8, 1998, now Pat. No. 6,037,008.

(51) Int. Cl.$^7$ ..................................................... C08L 83/06
(52) U.S. Cl. .................... 524/837; 524/588; 524/860; 524/863; 525/477; 556/458; 556/459; 528/17; 528/18; 427/387
(58) Field of Search .................... 524/837, 588, 524/860, 863; 525/477; 556/458, 459; 528/17, 18; 427/387

(56) References Cited

U.S. PATENT DOCUMENTS

| | | | |
|---|---|---|---|
| 3,355,406 | 11/1967 | Cekada | 260/29.2 |
| 4,062,451 | 12/1977 | Gander | 206/524.2 |
| 4,100,129 | 7/1978 | Beers | 260/37 |
| 4,221,688 | 9/1980 | Johnson et al. | 260/29.2 |
| 4,244,849 | 1/1981 | Saam | 260/29.2 |
| 4,309,326 | 1/1982 | Sage et al. | 260/29.6 |
| 4,394,418 | 7/1983 | Temple | 428/391 |
| 4,554,187 | 11/1985 | Grape et al. | 427/387 |
| 4,761,312 * | 8/1988 | Koshi et al. | |
| 4,778,624 | 10/1988 | Ohashi et al. | 252/312 |
| 4,816,506 | 3/1989 | Gamon et al. | 524/96 |
| 5,360,851 | 11/1994 | Feder et al. | 524/157 |
| 5,363,994 | 11/1994 | Angeline | 222/529 |
| 5,393,330 | 2/1995 | Chen et al. | 106/2 |
| 5,424,384 | 6/1995 | Gentle et al. | 528/12 |
| 5,438,095 * | 8/1995 | Liles et al. | |
| 5,621,038 | 4/1997 | Chen et al. | 524/547 |
| 5,686,523 | 11/1997 | Chen et al. | 524/547 |
| 5,714,532 | 2/1998 | Osterholtz et al. | 524/114 |

FOREIGN PATENT DOCUMENTS

| | | |
|---|---|---|
| 246 537 | 11/1987 | (EP) . |
| 266 729 | 5/1988 | (EP) . |
| 685173 * | 12/1952 | (GB) . |
| 98/13410 | 4/1998 | (WO) . |

OTHER PUBLICATIONS

"Silanol Terminated and Related Polydimethylsiloxanes," United Chemical Technologies, Inc., http://www.united-chem.com/silanol.htm.

"Silicones," http://www.psrc.usm.edu/macrog/silicone.html.

"Silicone Polymers," http://www.cslsilicones.ca/polymer/.

* cited by examiner

*Primary Examiner*—Robert Dawson
*Assistant Examiner*—Kuo-Liang Peng
(74) *Attorney, Agent, or Firm*—Michael P. Dilworth; Paul Grandinetti

(57) ABSTRACT

Novel hindered alkoxy siloxane compounds and compositions containing hindered alkoxy siloxane compounds are provided. The compositions include a polymer/crosslinking system which is composed of a self crosslinking resin comprised of a silicone fluid modified with pendant or terminal silanes containing hindered alkoxy groups, or a silanol fluid and a crosslinking compound, of a mixture thereof. These components are first emulsified and then formulated into a latex sealant by blending with a separate emulsion of an appropriate catalyst. Crosslinking occurs upon drying of the emulsion.

18 Claims, No Drawings

WATERBORNE SILICONE ADHESIVES, SEALANTS AND COATINGS

CROSS REFERENCE TO RELATED APPLICATION

This application is a continuation-in-part of copending U.S. application Ser. No. 09/149,337, filed Sep. 8, 1998, now U.S. Pat. No. 6,037,008, issued on Mar. 14, 2000.

BACKGROUND OF THE INVENTION

Silicone based aqueous dispersions crosslinkable into elastomeric sealants and coatings are known in the art. They generally comprise an oil in water emulsion of a polyorganosiloxane with hydroxy endgroups, a crosslinking agent, a non-siliceous inorganic filler and a curing catalyst. In particular, a great deal of effort has been directed to emulsions of standard α,ω-dihydroxypolydimethylsiloxane fluids in combination with many different crosslinkers as a basis for producing silicone latex sealants. The crosslinkers have included alkoxysilanes (U.S. Pat. No. 4,100,129), colloidal silica (U.S. Pat. No. 4,221,688), sodium silicate (U.S. Pat. No. 4,224,849), silsesquioxanes (U.S. Pat. No. 3,355,406), siliconates (EP 266 729), and reactive resins (U.S. Pat. No. 4,554,187). More recently the use of a disiloxane curative has been disclosed (WO 98/13410, Rhone Poulenc). Unfortunately, these emulsions have suffered from poor shelf stability, poor adhesion and poor physical properties.

Combinations of silicone emulsions and acrylic emulsions have been recently suggested to address some of these issues (U.S. Pat. No. 5,360,851 and EP 246 537, Rhone Poulenc). Similarly, U.S. Pat. No. 5,621,038 to Chen et al. discloses the modification of dispersion polymers with vinylsilanes containing hindered alkoxy groups. However, it does not mention silicone polymers modified with these vinyl silanes. U.S. Pat. No. 5,686,523 discloses the mixture of a dispersion polymer modified with a silyl group and an additional silane additive in the form of an alkoxysilane with hindered alkoxy groups.

U.S. Pat. No. 5,714,532, incorporated herein by reference, describes a series of alkoxysilanes which can be formulated into stable emulsions for waterborne coating or sealant formulations as crosslinkers or adhesion promoters.

Co-pending U.S. application Ser. No. 09/149,337, filed Sep. 8, 1998, incorporated herein in its entirety by reference extends the use of hindered silanes as additives to waterborne acrylic sealants. Increases in adhesion, shelf life and sealant physical properties are noted. In this technology the silanes are used as additives to a resin system or are incorporated into the resin during resin synthesis.

SUMMARY OF THE INVENTION

The present invention pertains to hindered siloxane compounds and to uses of said compositions in a variety of applications including RTV latex sealants, and more generally self-crosslinking sealants, as well as adhesives and coatings.

In one aspect the invention is a storage-stable aqueous silicone emulsion composition which cures upon drying, the composition comprising a blend of:

a) one or more emulsions which collectively comprise a reactive polymer/crosslinker system, the reactive polymer/crosslinker system comprising at least one condensable polyorganosiloxane polymer and at least one crosslinking compound, which may be the same or different than said condensable polyorganosiloxane polymer, the crosslinking compound having a plurality of hindered alkoxy groups of the formula —OR³ thereon, where R³ is an alkyl or alkoxy-substituted alkyl, aryl or aralkyl group and has from two to ten carbon atoms; and b) a separate aqueous emulsion comprising a silicone condensation catalyst. The reactive polymer/crosslinker system suitably includes a compound having thereon a group of the formula:

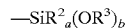

—SiR²$_a$(OR³)$_b$   I where R² is alkyl, alkoxy-substituted alkyl, aryl or aralkyl, and has from one to twelve carbon atoms; R³ is as previously defined; a is 0 or 1; b is 2 or 3 and a+b=3.

The compound having thereon a group of formula I may include at least one novel polyorganosiloxane polymer having thereon a plurality of groups of the formula II:

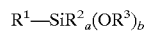

R¹—SiR²$_a$(OR³)$_b$   II linked to silicon atoms of at least one polyorganosiloxane backbone, where R¹ is a divalent organic group and R², R³, a and b are as previously defined. In such cases, the polyorganosiloxane polymer is self-crosslinking so that the reactive polymer/crosslinker system may consist only of the polyorganosiloxane polymer. These novel polymers constitute a further aspect of the invention.

Alternatively the reactive polymer/crosslinker system may include an emulsified silanol fluid and one or more crosslinker and/or adhesion promoter compounds of the formula III:

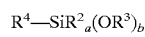

R⁴—SiR²$_a$(OR³)$_b$   III wherein R², R³, a and b are as previously defined and R⁴ is a vinyl group or a hydrocarbon group having from three to thirty carbon atoms which is optionally substituted with an organic functional group or an SiR²$_a$(OR³)$_b$ group. Reactive polymer/crosslinker systems also may be formulated which include a polyorganosiloxane polymer having thereon a plurality of groups of the formula II together with one or both of a silanol fluid and a compound of formula III.

Silanes and organosiloxane compounds having hydrolyzable groups wherein the hydrolyzable groups are hindered alkoxy groups defined by the formula OR³ have good stability in water so that they may be formulated into aqueous silicone emulsion compositions in a blend with a separately emulsified catalyst. By separately emulsifying the catalyst component, the catalyst can be kept isolated from the reactive polymer and crosslinker components of the composition until the composition is dried. As the composition dries the non-volatile components coalesce, bringing catalyst, polymer and crosslinker components into contact, thereby initiating curing.

DETAILED DESCRIPTION OF THE INVENTION

In formulae I, II, III, above, R¹ is exemplified by ethylene, propylene, propenylene, 1,4-butylene, 1,2-butylene, 1,3-butylene, amylene, phenethylene, α-methylphenethylene, and the like. R² is exemplified by methyl, ethyl, n-propyl, n-butyl, n-hexyl, n-heptyl, n-octyl, n-nonyl, n-decyl, lauryl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl and phenyl. R³ is exemplified by ethyl, n-propyl, n-butyl, n-hexyl, n-heptyl, n-octyl, n-nonyl, n-decyl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl and phenyl. $R^3$ groups having branched structures are preferred as they hydrolyze slower.

In formula III, above when $R^4$ is an unsubstituted saturated or aromatic hydrocarbon group the compound of formula III will generally be considered to be a crosslinker whereas when $R^4$ is an aliphatically unsaturated hydrocarbon group or has an organic functional group substituent the compound of formula III will generally be considered to be an adhesion promoter. In either case, however, the compound of formula III can function as a crosslinking compound within the definition of the invention herein. $R^4$ hydrocarbon groups may be alkyl, aralkyl, alkaryl, or aryl groups. Specific examples include propyl, isopropyl, butyl, isobutyl, amyl, isoamyl, hexyl, heptyl, octyl, xylyl, benzyl, phenyl, cyclopentyl, cyclohexyl, phenylmethyl, phenylethyl, and the like. Examples of optional organic-functional group substituents which may be included on the $R^4$ group include mercapto, epoxy, methacryloxy, acryloxy, chloro, bromo, iodo, cyano, ketone, aldehyde, carboxylate, carboxylic acid, silyl ester (e.g., $-SiR^2{}_b(OR^3)_{3-b}$ where $R^2$ and $R^3$ are as previously defined), amine, alkylamine, dialkylamine, arylamine, diarylamine, ureide, amide, isocyanurate, and alkoxy groups substituted with any of the foregoing. $R^4$ may also be a 3–30 carbon alkenyl group such as vinyl, allyl, oleyl, linoleyl, linolenyl, etc.

Polyorganosiloxanes having thereon a plurality of groups of the formula:

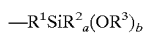

$$-R^1SiR^2{}_a(OR^3)_b \qquad \text{II}$$

linked to silicon atoms of the polyorganosiloxane backbone, where $R^1$ is a divalent hydrocarbon group; $R^2$ is alkyl, alkoxy-substituted alkyl, aryl or aralkyl, and has from one to twelve carbon atoms; $R^3$ is alkyl or alkoxy-substituted alkyl, aryl or aralkyl group, and has from two to ten carbon atoms; a is 0 or 1; b is 2 or 3 and a+b=3, may be prepared by reacting a linear or near linear hydrido substituted polyorganosiloxane with a hindered di- or tri- alkoxysilane having an aliphatically unsaturated hydrocarbon group bound to the silicon atom thereof under suitable hydrosilation conditions. The aliphatically unsaturated hydrocarbon group may be for instance vinyl, allyl, methallyl, crotyl, propargyl, prenyl, cyclohexenyl, styryl, or α-methylstyryl. Specific examples of such hindered di- or tri-alkoxysilanes include vinyltriethoxysilane, allyltriethoxysilane, vinyltriisopropoxysilane, allyltriisopropoxysilane, vinyltriisobutoxysilane, methallyltriisopropoxysilane, vinylmethyldiethoxysilane, allylmethyldiisopropoxysilane, and the like.

The hydrosilation reaction will typically utilize a conventional hydrosilation catalyst, suitably a platinum-based catalyst such as a chloroplatinic acid solution in ethanol. The hydrido siloxane, and a deficient amount of the unsaturated hindered alkoxysilane may be mixed, heated with stirring under an inert atmosphere such as $N_2$ and then catalyst added thereto. After an initial exotherm subsides additional hindered alkoxyvinylsilane then may be gradually added to the reaction mixture and the reaction allowed to proceed to completion. During the course of the reaction, the reaction mixture may be recatalyzed as needed. Following the reaction, the mixture is cooled somewhat and the catalyst neutralized. The resulting product may be purified using standard techniques to yield polyorganosiloxane polymers of the invention.

Suitable polyorganosiloxanes of the invention may be represented by the formula:

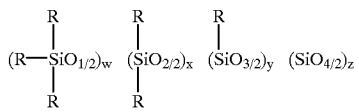

$$\text{IV}$$

where the R groups are independently $R^2$, $OR^3$ or $R^5$ groups; $R^2$ and $R^3$ are as previously defined; $R^5$ is a group of formula II, w 2+y+2z; y=0–2; z=0–2; y+z=0–2; w+y+z=2–30; and there are an average of at least two $R_5$ groups per molecule. Preferably w+x=2–15 and the average of the number of y and z units per molecule is at or near 0 so that the polymer is substantially linear. A suitable molecular weight range for the polyorganosiloxanes of the invention is from about 30,000 to about 350,000, more preferably from about 100,000 to about 200,000.

Aqueous Emulsion Compositions

The inventive curable compositions of the invention employ a reactive polymer/crosslinker system which includes at least one condensable polyorganosiloxane polymer and at least one crosslinking compound. The crosslinking compound may be the same or different than the condensable polymer.

The condensable polymer used may be an organosiloxane polymer having a plurality of hydrolyzable alkoxy groups, $OR^3$ thereon, or a silanol fluid. Mixtures of such polymers may also be used. Polyorganosiloxane polymers, as described above having a plurality of groups of formula II thereon may be used as the sole component of the reactive polymer/crosslinker system since they provide effective crosslinking sites on the polymer and hence are "self-crosslinking".

Suitable silanol fluids which may be employed as condensable polymers in the inventive compositions include α-ω-dihydroxypolydiorganosiloxanes. Such polymers comprise a chain of recurring $Z_2SiO$ repeat units where the Z groups are the same different substituted or unsubstituted monovalent hydrocarbon groups, endblocked with silicon-bonded hydroxyl groups. A preferred silanol fluid is a hydroxyl terminated polydimethylsiloxane. Desirably, the silanol fluid will have a molecular weight ranging from about 20,000 to about 200,000. The silanol fluid may be obtained commercially or may be prepared by hydrolysis of suitable chlorine terminated siloxanes or other siloxanes terminated with hydrolyzable endcappers such as alkoxy, acetyl, ketoxime or amine groups. Polyorganosiloxane fluids having pendant silanol groups on the polymer may also be used.

The silanol fluids may be used alone or in mixture with self-crosslinking silicone polymers as previously described as the condensable polymer component of the reactive polymer/crosslinker system. Suitably the total amount of condensable silicone polymer will range from 2 to 20% based on total composition weight.

As already noted the crosslinker compound component of the reactive polymer/crosslinker system may be a self-crosslinking polymer of the invention. However, other compounds having a plurality of $-OR^3$ groups may also be employed, alone or in combination with the self-crosslinking polymer, as crosslinking compounds in the reactive polymer/crosslinker system. It may be desirable to also include additional crosslinker and/or adhesion promoter silanes as described below in the composition.

Suitable other crosslinking compounds which may be employed in the compositions of the invention are water insoluble or only slightly soluble crosslinker and/or adhesion promoter silanes of formula III, above. The term water insoluble or slightly soluble silanes includes alkoxy silanes with solubilities between 0 and 8.0 weight percent in water at 25° C. Water insoluble alkoxy silanes with solubilities between 0 and 1 weight percent in water at 25° C. are preferred. Water soluble alkoxy silanes are not used because compositions made with such silanes are not stable for extended periods of time, i.e., more than two to three days at ambient conditions. Therefore, the substituent groups on silicon should be chosen to ensure low solubility of the silane in water.

Examples of crosslinker silanes of formula III include methyltriisobutoxysilane, dimethyldipropoxysilane, ethyltriisopropoxysilane, diethyldipropoxysilane, propyltriisobutoxysilane, butyltributoxysilane, octyltriethoxysilane, amyltributoxysilane, amyltriethoxysilane, dodecyltriethoxysilane and phenyltriethoxysilane, dimethylbis-(isobutoxy)silane, dibutylbis-(isopropoxy)silane, and diphenyldipropoxysilane. Water insoluble or semi-soluble bis silyl alkanes of the formula:

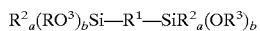

such as the 1,2 bis-(alkoxy) silyl ethanes:

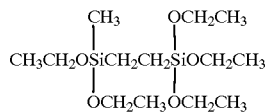

and

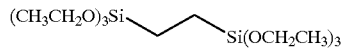

may also be used as crosslinkers.

Examples of adhesion promoter silane compounds of formula III, above, include β-(3,4-epoxycyclohexyl)-ethyltriethoxysilane, β-(3,4-epoxycyclohexyl)-ethyltriisopropoxysilane, β-(3,4-epoxycyclohexyl)-ethyltriisobutoxysilane, 3-glycidoxypropyltriisobutoxysilane, 3-methacryloxypropyltriethoxysilane, 3-methacryloxypropyltriisopropoxysilane, 3-methacryloxypropyltriisobutoxysilane, vinyltriisopropoxysilane, vinyltriisobutoxysilane, 3-acryloxypropyltriethoxysilane, 3-mercaptopropyltriethoxysilane, vinylmethylbis-(isopropoxy)silane and 3-methacryloxypropylmethyldibutoxysilane. Tris silanes with hindered alkoxy groups, such as tris(3-triethoxysilylpropyl) isocyanurate may also be used as adhesion promoters.

As adhesion promoter silanes are generally more expensive than crosslinker silanes, mixtures of crosslinker silanes and adhesion promoter silanes are generally recommended when these compounds are used as crosslinking compounds in the inventive compositions. Suitable amounts for such crosslinker and/or adhesion promoting silanes range from 0 to about 30%, more preferably from about 0.1 to about 10% by weight of the silicone emulsion composition.

The component(s) of the reactive polymer/crosslinking system can be added to the composition as a single emulsion or in multiple emulsions. For instance, as separate emulsions of polymer and of crosslinker.

One or more emulsifiers will generally be required to prepare stable emulsions of the components of the inventive compositions. Suitable emulsifiers include nonionic, anionic or cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl)dimethyl ammonium salts. A further listing of surfactants useful in the present invention may be those described in 1994 McCutcheon's Vol. 1: *Emulsifiers and Detergents*, North American Edition (Manufacturing Confectioner Publishing Co., Glen Rock) 1994, which is incorporated herein by reference. The emulsifier(s) is suitably employed in the inventive composition in an amount of 0.05 to 30 percent by weight of the total composition, preferably 0.2 to 20 weight percent.

The silane condensation catalyst employed in the self-crosslinking compositions of the invention should be a hydrolytically stable compound which is capable of catalyzing condensation reactions of alkoxysilyl compounds with each other and/or with silanol functional compounds. Suitable catalysts which can be employed if desired include organotin, titanate, water insoluble tertiary amine, imidazole and the like. Preferred catalysts include organotin, chelated titanium, aluminum and zirconium compounds, and combinations thereof Examples of chelated titanates are dihydroxy bis [2-hydroxypropanato (2-)-$O^1,O^2$)(2-)titanate, mixed titanium ortho ester complexes, TYZOR® 101, TYZOR GBA (acetylacetonate chelate), bis(ethyl-3-oxobutanolato $O^1,O^3$) bis(2-propanolato) titanium, TYZOR CLA, isopropoxy (triethanolaminato) titanium and alkanolamine complex of titanium, with TYZOR 131, LA, and 101 being preferred, all commercially available from E. I. DuPont de Nemours and Co., Wilmington, Del. Examples of organotin catalysts are FOMREZ® SUL-1, SUL-22, and SUL-32 available from Witco Corp., Greenwich, Conn., FASCAT® 4224 available from Elf-Atochem and dibutyltin bis(1-thioglycerol). The catalyst can be used in an amount of 0.05–5 weight percent of the composition, preferably 1–3%. The condensation catalyst component should be separately emulsified in water and then blended with the emulsion or emulsions which make up the reactive polymer/crosslinker system so that the catalyst remains isolated from the reactive components of the composition until it is dried.

A plasticizer optionally may be included in the inventive formulations. Suitable plasticizers include non-reactive polyorganosiloxanes of the formula:

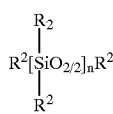

where the $R^2$ groups are as previously defined. Desirably, an emulsified trimethylsilyl terminated polydimethylsiloxane will be used. The plasticizer may be present in an amount ranging from about 0% to about 15% by weight of the total composition.

Additionally the self-crosslinking silicone emulsion composition can be modified with dispersed fillers such as silica, carbon black, thixotropes, pigments, coalescing agents, biocides, fungicides, UV inhibitors, anti-oxidants other modifiers conventional in curable aqueous polymer emulsion formulations or in RTV silicone formulations. Such components may be employed in conventional amounts. A suitable amount for fillers is from 0% to about 50% by weight of the total formulation.

Non-reactive components such as plasticizers, fillers and the like may be emulsified with the reactive components or the catalyst or both, or they may be separately emulsified and then blended with the reactive component emulsion(s) and catalyst emulsion.

The amount of water present in the aqueous emulsion formulations is typically an amount raging from 5 to 98 weight percent of the total composition, more typically 30–95%.

The pH of the silicone emulsion compositions of the invention may impact upon their hydrostability. High alkalinity or high acidity of the composition catalyzes the hydrolysis and condensation of the alkoxysilyl group of the silane. The closer the pH of the composition is to neutral, the better the stability of the emulsion. Therefore, the preferred range of pH is 5.5 to 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

The silicone emulsion compositions of the present invention may be prepared by first mixing the emulsifier with the components to be individually emulsified. Typically, a portion of material being emulsified is mixed with the emulsifier(s) and stirred. The remaining material being emulsified is added dropwise to the mixture and the string speed increased. After the remaining siloxane has been added, deionized water is added and the mixture stirred at high speed to provide an emulsion. The component emulsions are then blended to form a composition of the invention. The pH can be adjusted on the component emulsions and/or on the final blended composition, suitably to pH 7.0±1.5.

In use it is recommended that the aqueous silicone emulsion composition be applied at a temperature above 0° C. It can be dried at a room temperature, or higher, to coalesce the separately emulsified components, thereby bringing the reactive and catalyst into contact and initiating curing.

The invention is illustrated by the following non-limiting examples.

EXAMPLES

In the following Examples, the following abbreviations are used: Me=methyl; Et=ethyl; iPr=isopropyl.

Example 1

Synthesis of $(EtO)_3SiC_2H_4Me_2Si(OSiMe_2)_5OSiMe_2C_2H_4Si(OEt)_3$

A 1 L, four neck round bottom flask was fitted with a mechanical stirrer, nitrogen inlet, temperature controller, heating mantle and addition funnel. Triethoxyvinylsilane (11.4 g, 0.060 mole), $HMe_2Si(OSiMe_2)_5OSiMe2H$ (136.4 g, 0.270 mole), and sodium propionate (0.11 g, 1.1 mmole) were charged to the flask under a nitrogen blanket. The mixture was stirred and heated to 75° C., at which point 1% chloroplatinic acid solution in ethanol (CPA, 0.16 ml, ~5 ppm) was added via syringe. The temperature of the mixture quickly rose to 90° C., over a period of about one minute. After the initial exotherm subsided, triethoxyvinylsilane (102.2 g, 0.537 mole) was added dropwise over a period of about 15 minutes. The temperature of the reaction mixture was maintained between 80 and 90° C. during the addition. After the addition was completed, the reaction was stirred one hour at 90° C., after which time analysis indicated residual Si—H content. The reaction was recatalyzed with CPA (0.1 ml, ~3 ppm), and stirred an additional one hour. Subsequent analysis indicated complete reaction. The mixture was cooled to 50° C. and sodium bicarbonate (25 g) was added to neutralize the catalyst. After stirring for one hour at this temperature, the reaction product was filtered and stripped at reduced pressure, yielding a low viscosity, clear colorless liquid identified as $(Eto)_3SiC_2H_4Me_2Si(OSiMe_2)_5OSiMe_2C_2H_4Si(OEt)_3$.

Example 2

Synthesis of $(EtO)_3SiC_2H_4Me_2Si(OSiMe_2)_{10}OSiMe_2C_2H_4si(OEt)_3$

A 1 L, four neck round bottom flask was fitted with a mechanical stirrer, condenser, nitrogen inlet, temperature controller, heating mantle and addition funnel. Triethoxyvinylsilane (9.2 g, 0.048 mole), $HMe_2Si(OSiMe_2)_{10}OSiMe_2H$ (157.4 g, 0.178 mole), and sodium propionate (0.09 g, 0.9 mmole) were charged to the flask under a nitrogen blanket. The mixture was stirred and heated to 75° C., at which point 1% chloroplatinic acid solution in ethanol (CPA, 0.16 ml, ~5 ppm) was added via syringe. The temperature of the mixture quickly rose to 86° C., over a period of about one minute. After the initial exotherm subsided, the temperature was maintained at 90° C., and triethoxyvinylsilane (102.2 g, 0.537 mole) was added dropwise over a period of about 15 minutes. After the addition was completed, analysis indicated residual Si—H content. The reaction was recatalyzed with CPA (0.1 ml, ~3 ppm), and stirred one hour. Analysis indicated complete reaction. The mixture was cooled to 50° C., and sodium bicarbonate (25 g) was added to neutralize the catalyst. After stirring for one hour at this temperature, the reaction product was filtered and stripped at reduced pressure, yielding a low viscosity, clear colorless liquid identified as $(EtO)_3SiC_2H_4Me_2Si(OSiMe_2)_{10}OSiMe_2C_2H_4Si(OEt)_3$.

Example 3

Synthesis of $(iPrO)_3SiC_2H_4Me_2Si(OSiMe_2)_{10}OSiMe_2C_2H_4Si(OiPr)_3$

A 2 L, four neck round bottom flask was fitted with a mechanical stirrer, nitrogen inlet, temperature controller, heating mantle and addition funnel. Triisopropoxyvinylsilane (20.4 g, 0.088 mole), $H_4Me_2Si(OSiMe2)_{10}OSiMe_2H$ (346.3 g, 0.396 mole), and sodium propionate (0.2 g, 0.002 mole) were charged to the flask under a nitrogen blanket. The mixture was stirred and heated to 80° C., at which point 1% chloroplatinic acid solution in ethanol (CPA, 0.21 ml, ~3 ppm) was added via syringe. The temperature of the mixture quickly rose to 90° C. over a period of about one minute. After the initial exotherm subsided, triisopropoxyvinylsilane (183.3 g, 0.789 mole) was added dropwise over a period of ~30 minutes. The temperature of the reaction mixture was maintained between 80 and 90° C. during the addition. After the addition was completed, the reaction was stirred for one hour at 90° C., at which time analysis indicated residual Si—H content. The mixture was recatalyzed with additional CPA (0.28 ml, ~4 ppm) over the next 2 hours, at which time the residual Si—H content was nil and the reaction considered complete. The mixture was cooled to 50° C. and sodium bicarbonate (50 g) was added to neutralize the catalyst. After stirring for one hour at this temperature, the reaction product was filtered and stripped at reduced pressure, yielding a low viscosity, clear colorless liquid identified as (iPro)$_3$SiC$_2$H$_4$Me$_2$Si(OSiMe$_2$)$_{10}$OSiMe$_2$C$_2$H$_4$Si(OiPr)$_3$.

Example 4

Synthesis of (iPrO)$_3$SiC$_2$H$_4$Me$_2$Si(OSiMe$_2$)$_{15}$OSiMe$_2$C$_2$H$_4$Si(OiPr)$_3$ A 500 ml, four neck round bottom flask was fitted with a mechanical stirrer, nitrogen inlet, temperature controller, heating mantle and addition funnel. Triisopropoxyvinylsilane (7.9 g, 0.034 mole), HMe$_2$Si(OSiMe$_2$)$_{15}$OSiMe$_2$H (171 g, 0.137 mole), and sodium propionate (0.08 g, 0.8 mmole) were charged to the flask under a nitrogen blanket. The mixture was stirred and heated to 80° C., at which point 1% chloroplatinic acid solution in ethanol (CPA, 0.16 ml, 5 ppm) was added via syringe. The temperature of the mixture quickly rose to 89° C., over a period of about one minute. After the initial exotherm subsided, triisopropoxyvinylsilane (71.1 g, 0.306 mole) was added dropwise over a period of about 15 minutes. The temperature of the reaction mixture was maintained between 80 and 90° C. during the addition. After the addition was completed, the reaction was stirred one hour at 90° C. Analysis did not indicate residual Si—H content, thus the reaction was complete. The mixture was cooled to 50° C., and sodium bicarbonate (25 g) was added to neutralize the catalyst. After stirring for one hour at this temperature, the reaction product was filtered and stripped at reduced pressure, yielding a low viscosity, clear colorless liquid identified as (iPro)$_3$SiC$_2$H$_4$Me$_2$Si(OSiMe$_2$)$_{15}$OSiMe$_2$C$_2$H$_4$Si(OiPr)$_3$.

Example 5

Synthesis of (iPrO)$_3$SiC$_2$H$_4$Me$_2$Si(OSiMe$_2$)$_5$OSiMe$_2$C$_2$H$_4$Si(OiPr)$_3$ A 2 L, four neck round bottom flask was fitted with a mechanical stirrer, nitrogen inlet, temperature controller, heating mantle and addition funnel. Triisopropoxyvinylsilane (29.3 g, 0.126 mol), HMe$_2$Si(OSiMe$_2$)$_5$OSiMe$_2$H (256.9 g, 0.509 mol), and sodium propionate (0.3 g, 0.003 mol) were charged to the flask under a nitrogen blanket. The mixture was stirred and heated to 80° C., at which point 1% chloroplatinic acid solution in ethanol (CPA, 0.21 ml, ~3 ppm) was added via syringe. The temperature of the mixture quickly rose to 94° C. over a period of about one minute. After the initial exotherm subsided, triisopropoxyvinylsilane (263.8 g, 1.135 mol) was added dropwise over a period of ~30 minutes, The temperature of the reaction mixture was maintained between 80 and 90° C. during the addition. After the addition was completed, the reaction was stirred for one hour at 90° C., at which time analysis indicated residual Si—H content. The mixture was recatalyzed with additional CPA (0.28 ml, ~4 ppm) over the next 2 hours, at which time the residual Si—H content was nil and the reaction considered complete. The mixture was cooled to 50° C. and sodium bicarbonate (50 g) was added to neutralize the catalyst. After stirring for one hour at this temperature, the reaction product was filtered and stripped at reduced pressure, yielding a low viscosity, clear colorless liquid identified as (iPrO)$_3$SiC$_2$H$_4$Me$_2$Si(OSiMe$_2$)$_5$OSiMe$_2$C$_2$H$_4$Si(OiPr)$_3$.

Example 6

Synthesis of (EtO)$_3$SiC$_2$H$_4$Me$_2$Si(OSiMe$_2$)$_{15}$OSiMe$_2$C$_2$H$_4$Si(OEt)$_3$ A 1 L, four neck round bottom flask was fitted with a mechanical stirrer, condenser, nitrogen inlet, temperature controller, heating mantle and addition funnel. Triethoxyvinylsilane (6.3 g, 0.033 mol), HMe$_2$Si(OSiMe$_2$)$_{15}$OSiMe$_2$H (186.9 g, 0.150 mol) and sodium propionate (0.06 g, 0.6 mmol) were charged to the flask under a nitrogen blanket. The mixture was stirred and heated to 75° C., at which point 1% chloroplatinic acid solution in ethanol (CPA, 0.16 ml, ~5 ppm) was added via syringe. The temperature of the mixture quickly rose to 84° C., over a period of about one minute. After the initial exotherm subsided triethoxyvinylsilane (56.8 g, 0.298 mol) was added dropwise over a period of about 15 minutes. The temperature of the reaction mixture was maintained between 80 and 90° C. during the addition. After the addition, analysis indicated complete reaction. The mixture was cooled to 50° C., and sodium bicarbonate (25 g) was added to neutralize the catalyst. After stirring for one hour at this temperature, the reaction product was filtered and stripped at reduced pressure, yielding a low viscosity, clear colorless liquid identified as (EtO)$_3$SiC$_2$H$_4$Me$_2$Si(OSiMe$_2$)$_{15}$OSiMe$_2$C$_2$H$_4$Si(OEt)$_3$.

Examples 7–12

Preparation of Emulsions of Silylated Siloxanes

Formulation:

| | |
|---|---|
| Silylated siloxane | 35 g |
| Witco CO-50 (sodium dodecylbenzene sulfonate) | 2.5 g |
| Adhesion Promoter | 10 g |
| Neodol 1–7 (ethoxlyated alcohol, Shell Chem.) | 2.5 g |
| Deionized water | 60 g |

The emulsions were prepared by mixing 5 grams of the siloxane with the emulsifiers, Witco CO-50 and Neodol 1–7, at stirring speed of 800 rpm. The rest of the siloxane and the adhesion promoter was added dropwise. Agitation was increased to 1200 rpm after the addition, and then slowly added the deionized water. The pH value of the emulsion was approximately 7.0. Several silylated siloxane emulsions were made and designated as follows:

| Designation | Silyated siloxane | Adhesion promoter |
|---|---|---|
| Example 7 | Example 5 | CoatOsil 1706* |
| Example 8 | Example 3 | CoatOsil 1706 |
| Example 9 | Example 4 | CoatOsil 1706 |
| Example 10 | Example 1 | A-151** |
| Example 11 | Example 2 | A-151 |
| Example 12 | Example 6 | A-151 |

*CoatOsil 1706 - epoxycyclohexylethyltriethoxysilane, Witco Corp.
**A-151 vinyltriethoxysilane, Witco Corp.

Example 13

Preparation of Emulsion of Silane Trimer

| Formulation: | | |
|---|---|---|
| | tris(triethoxysilylpropyl)isocyanurate | 24.06 g |
| | Span ® 60 (ICI) | 1.85 g |
| | Tween ® 40 (ICI) | 1.76 g |
| | Distilled water | 32.40 g |

The emulsifiers, Spans® 60 and Tween®, 40 were weighed into polypropylene beaker and heated in a water bath at 60 to 80° C. to melt the Span® 60. Then the silane trimer was added at once with an agitation speed of 1200 rpm. After 15 minutes of mixing, the heat was turned off and the distilled water was added. This mixture was continuously stirred for two hours. The pH value of the emulsion was adjusted to 6.5–7.0.

Example 14

Preparation of Emulsion of Organotin Catalyst

| Formulation: | FASCAT 4224 (Elf Atochem) organotin catalyst | 5 g |
|---|---|---|
| | IGEPAL CA-897(Phone-Poulenc) | 7.1 g |
| | Double distilled water | 7.9 g |

The mixture was stirred vigorously for about 30 minutes. A stable emulsion was obtained.

Example 15

Composition Example

The polymer/adhesion promoter emulsion of Example 11 (5 grams) was blended with 0.5 gram of the catalyst emulsion of Example 14. The resulting composition was cast in an aluminum dish. A white pale film was formed after 36 hours cure at room temperature.

Example 16

Composition Example

The polymer/adhesion promoter emulsion of Example 11 (5 grams) was mixed with 2 grams of the silane trimer emulsion of Example 13 and 0.5 gram of the catalyst emulsion of Example 14. The resulting composition was cast in an aluminum dish. The sample was cured at room temperature overnight and further dried at 50° C. for 3 hours. A white and waxy film formed.

Example 17

Composition Example

A mixture of 5 grams of the polymer/adhesion promoter emulsion of Example 8; 2 grams of the silane trimer emulsion of Example 13 and 0.7 gram of the catalyst emulsion of Example 14 was prepared, cast in an aluminum dish and cured at room temperature. A white gel formed after 16 hours, the sample was then baked at 100 C for 40 minutes. A white solid film formed.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A storage stable aqueous silicone emulsion composition that cures upon drying comprising a blend of:
   a) one or more emulsions that collectively comprise a reactive polymer/crosslinker system comprising a compound having thereon a group of formula I:

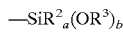   I wherein $R^2$ is alkyl, alkoxy-substituted alkyl, aryl or aralkyl, and has 1 to 12 carbon atoms; $R^3$ is alkyl, alkoxy-substituted alkyl, aryl, or aralkyl, and has 2 to 10 carbon atoms; a is 0 or 1; b is 2 or 3; a+b is 3;

the reactive polymer/crosslinker system comprising:
   (i) at least one condensable polyorganosiloxane polymer of formula IV:

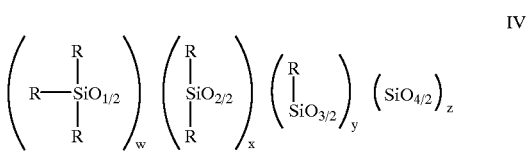   IV where R is independently $R^2$, $OR^3$, or $R^5$; $R^5$ is a group of formula II:

   II where $R^1$ is a divalent organic group, w is 2+y+2z; y is 0 to 2; z is 0 to 2; y+z is 0 to 2; w +x+y+z is 2 to 30; and there are an average of at least two $R^5$ groups per molecule; and
   (ii) at least one crosslinking compound, which may be the same as or different from the at least one condensable polyorganosiloxane polymer of formula IV, the crosslinking compound having a plurality of hindered alkoxy groups of the formula —$OR^3$ thereon, where $R^3$ is an alkyl or alkoxy-substituted alkyl, aryl or aralkyl group and has from 2 to 10 carbon atoms; and
   b) a separate aqueous emulsion comprising a silicone condensation catalyst.

2. The composition of claim 1 wherein the at least one crosslinking compound is the same as the at least one condensable polyorganosiloxane polymer.

3. The composition of claim 1 wherein the at least one crosslinking compound is present in an amount of from greater than 0 to about 30% based on the total composition weight.

4. The composition of claim 1 wherein the at least one crosslinking compound has formula:

wherein $R^2$ is alkyl, alkoxy-substituted alkyl, aryl or aralkyl having from 1 to 12 carbon atoms; $R^3$ is alkyl, alkoxy-substituted alkyl, aryl, or aralkyl having from 2 to 10 carbon atoms; a is 0 or 1; b is 2 or 3; a+b is 3; and $R^4$ is a vinyl group or a hydrocarbon group having from 3 to 30 carbon atoms, substituted with an organic functional group or an $SiR^2_a(OR^3)_b$ group.

5. The composition of claim 1 wherein the at least one crosslinking compound has formula:

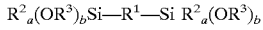

wherein $R^2$ is alkyl, alkoxy-substituted alkyl, aryl or aralkyl having from 1 to 12 carbon atoms; $R^3$ is alkyl, alkoxy-substituted alkyl, aryl, or aralkyl having from 2 to 10 carbon atoms; a is 0 or 1; b is 2 or 3; and a+b is 3.

6. The composition of claim 1 wherein the at least one crosslinking compound is selected from the group consisting of methyltriisobutoxysilane, dimethyidipropoxysilane, ethyltriisobutoxysilane, octyltriethoxysilane, amyltributoxysilane, amyltriethoxysilane, dodecyltriethoxysilane, phenyltriethoxysilane, dimethylbis-(isobutoxy)silane, dibutylbis-(isopropoxy)silane, and diphenyldipropoxysilane.

7. The composition of claim 1 wherein the reactive polymer/crosslinking system further includes an adhesion promoter.

8. The composition of claim 7 wherein the adhesion promoter is selected from the group consisting of:

β-(3,4-epoxycyclohexyl)-ethyltriethoxysilane,

β-(3,4-epoxycyclohexyl)-ethyltriisopropoxysilane,

β-(3,4-epoxycyclohexyl)-ethyltriisobutoxysilane, 3-glycidoxypropyltriisobutoxysilane, 3-methacryloxypropyltriethoxysilane, 3-methacryloxypropyltriisopropoxysilane, 3-methacryloxypropyltriisobutoxysilane, vinyltriisopropoxysilane, vinyltriisobutoxysilane, 3-acryloxypropyltriethoxysilane, 3-mercaptopropyltriethoxysilane, vinylmethylbis-(isopropoxy)silane, 3-methacryloxypropylmethyldibutoxysilane, and tris-(3-triethoxysilylpropyl)isocyanurate.

9. The composition of claim 1 wherein the reactive polymer/crosslinking system further includes an emulsified silanol fluid.

10. The composition of claim 9 wherein the emulsified silanol fluid comprises α-ω-dihydroxypolydiorganosiloxanes.

11. The composition of claim 9 wherein the emulsified silanol fluid of the reactive polymer/crosslinking system is present in an amount of 2 to 20% based on the total composition weight.

12. The composition of claim 1 further including one or more emulsifiers selected from the group consisting of nonionic surfactants, anionic surfactants, cationic surfactants, and a mixture of nonionic surfactants with anionic surfactants or cationic surfactants.

13. The composition of claim 1 wherein the silicone condensation catalyst is selected from the group consisting of organotin, chelated titanium compounds, chelated aluminum compounds, chelated zirconium compounds, and mixtures thereof.

14. The composition of claim 1 wherein the silicone condensation catalyst is present in an amount of about 0.05 to about 5% based on the total composition weight.

15. The composition of claim 1 further including a plasticizer.

16. The composition of claim 1 further including one or more fillers selected from the group consisting of silica, carbon black, thixotropes, pigments, coalescing agents, biocides, fungicides, UV inhibitors, and anti-oxidants.

17. The composition of claim 16 wherein the one or more fillers are present in an amount of from greater than 0 to about 50% based on the total composition weight.

18. A method for providing a crosslinked silicone on a substrate comprising applying to said substrate a composition comprising a blend of:

a) one or more emulsions that collectively comprise a reactive polymer/crosslinker system comprising a compound having thereon a group of formula I:

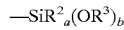

$$—SiR^2_a(OR^3)_b \qquad \qquad I$$

wherein $R^2$ is alkyl, alkoxy-substituted alkyl, aryl or aralkyl and has 1 to 12 carbon atoms; $R^3$ is alkyl, alkoxy-substituted alkyl, aryl, or aralkyl, and has 2 to 10 carbon atoms; a is 0 or 1; b is 2 or 3; a+b is 3;

the reactive polymer/crosslinker system comprising:

(i) at least one condensable polyorganosiloxane polymer of formula IV:

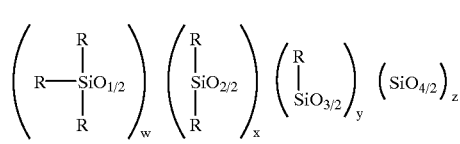

$$\left(R-\underset{R}{\overset{R}{SiO_{1/2}}}\right)_w \left(\underset{R}{\overset{R}{SiO_{2/2}}}\right)_x \left(\overset{R}{SiO_{3/2}}\right)_y \left(SiO_{4/2}\right)_z \qquad IV$$

where R is independently $R^2$, $OR^3$, or $R^5$ is a group of formula II:

$$R^1—SiR^2_a(OR^3)_b \qquad \qquad II$$

where $R^1$ is a divalent organic group, w is 2+y+2z; y is 0 to 2; z is 0 to 2; y+z is 0 to 2; w+x+y+z is 2 to 30; and there is an average of at least two $R^5$ groups per molecule; and (ii) at least one crosslinking compound, which may be the same as or different from the at least one condensable polyorganosiloxane polymer of formula IV, the crosslinking compound having a plurality of hindered alkoxy groups of the formula —$OR^3$ thereon, where $R^3$ is an alkyl or alkoxy-substituted alkyl, aryl or aralkyl group and has from 2 to 10 carbon atoms; and b) a separate aqueous emulsion comprising a silicone condensation catalyst.

* * * * *